US009778007B1

(12) United States Patent
Briggs et al.

(10) Patent No.: US 9,778,007 B1
(45) Date of Patent: Oct. 3, 2017

(54) MATCHING A SPENT FIREARM CARTRIDGE

(71) Applicant: International Business Machines Corporation, Armonk, NY (US)

(72) Inventors: Benjamin D. Briggs, Waterford, NY (US); Lawrence A. Clevenger, LaGrangeville, NY (US); Bartlet H. DeProspo, Goshen, NY (US); Michael Rizzolo, Albany, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/186,706

(22) Filed: Jun. 20, 2016

(51) Int. Cl.
| | | |
|---|---|---|
| *F42B 35/00* | (2006.01) | |
| *G06T 7/00* | (2017.01) | |
| *G06T 7/60* | (2017.01) | |
| *G06K 9/52* | (2006.01) | |

(Continued)

(52) U.S. Cl.
CPC .......... *F42B 35/00* (2013.01); *G06F 17/3028* (2013.01); *G06F 17/30259* (2013.01); *G06F 17/30262* (2013.01); *G06K 9/52* (2013.01); *G06K 9/6215* (2013.01);

(Continued)

(58) Field of Classification Search
CPC ......... B81C 2201/0149; B81C 1/00031; F41A 19/57; B82Y 30/00; B82Y 40/00; F42B 35/00; G06F 17/30259; G06F 17/30262; G06K 9/52
See application file for complete search history.

(56) References Cited

U.S. PATENT DOCUMENTS

| | | | |
|---|---|---|---|
| 5,685,100 A | | 11/1997 | Atchison |
| 6,002,807 A | * | 12/1999 | Guerci ................ G06K 9/6203 382/116 |
| 6,886,284 B2 | | 5/2005 | Lizotte |

(Continued)

FOREIGN PATENT DOCUMENTS

| | | |
|---|---|---|
| CA | 2423323 | 12/2009 |
| WO | 9721128 | 6/1997 |

OTHER PUBLICATIONS

Hyung Jong Bae et al., "Biomimetic Microfi ngerprints for Anti-Counterfeiting Strategies", Advanced Materials, 2015 Wiley-VCH Verlag GmbH & Co. KGaA, Weinheim, pp. 2083-2089.*

(Continued)

*Primary Examiner* — Brian P Werner
(74) *Attorney, Agent, or Firm* — Fleit Gibbons Gutman Bongini Bianco PL; Jon Gibbons

(57) ABSTRACT

Disclosed is a novel system, and method for matching a spent firearm cartridge. The method starts with applying a directed self-assembly (DSA) process to produce a nano-scale pattern on a tip of a firing pin for a firearm. The DSA process including: a) disposing a neutral substrate on the firing pin; b) lithographically placing two or more base polymer chains on the neutral substrate, at least two of the two or more base polymer chains being different lengths, so that the two or more base polymer chains align end-to-end in an alternating structure, and c) extracting at least one of the two or more base polymer chains leaving at least one of the base polymer chains remaining thereby forming a randomly oriented pattern. Next, the randomly oriented pattern is used as blocking mask to form a randomly oriented metallization pattern.

21 Claims, 8 Drawing Sheets

(51) Int. Cl.
*G06K 9/62* (2006.01)
*G06F 17/30* (2006.01)

(52) U.S. Cl.
CPC .............. *G06T 7/0012* (2013.01); *G06T 7/60* (2013.01); *G06T 2207/30108* (2013.01)

(56) References Cited

U.S. PATENT DOCUMENTS

| | | | |
|---|---|---|---|
| 7,380,706 | B2 | 6/2008 | Lightfoot et al. |
| 2004/0217173 | A1* | 11/2004 | Lizotte .................. F41A 21/12 235/462.01 |
| 2005/0032226 | A1* | 2/2005 | Natan .................. B01J 13/0047 506/4 |
| 2005/0241203 | A1 | 11/2005 | Lizotte et al. |
| 2006/0177104 | A1* | 8/2006 | Prokoski ................ F42B 35/00 382/108 |
| 2009/0028379 | A1 | 1/2009 | Belanger et al. |

OTHER PUBLICATIONS

Krivosta, G., "NanoTag™ Markings from Another Perspective", AFTE Journal, Winter 2006, pp. 1-7, vol. 38, No. 1.

Overton, I., "How Many Guns? Gun ownership around the world explained", https://aoav.org.uk/2014/many-guns-gun-ownership-around-world-explained/, Dec. 4, 2014, pp. 1-8.

Tong, M., et al., "Fired Cartridge Case Identification Using Optical Images and the Congruent Matching Cells (CMC) Method", Journal of Research of the National Institute of Standards and Technology, Nov. 6, 2014, pp. 1-8, vol. 119.

Bourov, G., "Simulation Studies of Self-Assembly and Phase Diagram of Amphiphilic Molecules", University of Central Florida, Electronic Theses and Dissertations, Summer Term 2005, pp. 1-131.

CSEM, "Security Features Based on Anticounterfeitable Nanostructures", http://www.csem.ch/docs/Show.aspx?id=11629, last visited on Apr. 7, 2016, p. 1.

Renwick, S., "Scanner Effects on Directed Self-Assembly Patterning", downloaded from: http://proceedings.spiedigitallibrary.org/ on Jul. 31, 2015, pp. 1-12.

Hinsberg, W., et al., "Self-Assembling Materials for Lithographic Patterning: Overview, Status and Moving Forward", SPIE. Digital Library, Feb. 21, 2010, pp. 1-11, vol. 7637.

Wikipedia, "Self-assembly", https://en.wikipedia.org/wiki/Self-assembly, last visited on May 16, 2016, pp. 1-7.

Gu, X., et al., "Pattern transfer using block copolymers", Philosophical Transactions of the Royal Society, Sep. 2, 2013, http://dx.doi.org/10.1098/rsta.2012.0306, pp. 1-34.

Hsu, K., et al., "Electrochemical Nanoimprinting with Solid-State Superionic Stamps", Nano Letters, Jan. 26, 2007, pp. 1-6, vol. 7, No. 2.

Chou, S., et al., "Ultrafast and direct imprint of nanostructures in silicon", Nature, Jun. 20, 2002, pp. 1-3, vol. 417.

Tormen, M., et al. "Sub-100 µs nanoimprint lithography at wafer scale", Microelectronic Engineering, Jan. 2015, pp. 1-6, vol. 141.

Thundernil, "Discover ThunderNIL's technology and products", http://old.thundernil.com/, last visited on Jun. 8, 2016, pp. 1-3.

Wikipedia, "Nanoimprint Lithography", https://en.wikipedia.org/wiki/Nanoimprint_lithography, last visited on Jun. 8, 2016, pp. 1-10.

* cited by examiner

MATCHING A SPENT FIREARM CARTRIDGE

BACKGROUND

The present invention generally relates to a method and system for identifying fired cartridge cases, and more specifically to forming a randomly oriented pattern on a firing pin.

It is well known that fired bullets and spent cartridge cases are left with markings from the firearm from which they come. The ability to match a bullet casing to the firearm which it was discharged from is hampered by a few things. If the bullet is destroyed upon contact it can be very difficult to match it to the respective firearm. Current casings don't employ an imprinting technique for verification and any imprinting technique is currently micro scaled which can be easily filed off or duplicated.

SUMMARY

Patterning of a low cost, uniquely random nano-scale pattern that is constructed by self-assembled polymers into the firing pin of a firearm. When the firearm is discharged the firing pin will imprint the gun's unique signature into the casing inside of the firearm. The unique signature is extremely difficult to duplicate or remove due to the nano-scale feature size. The signature can then be cross referenced with a database containing all of the patterns and their respective firearms. This will be able to identify the owner of the firearm with the shell casing from the firearm.

More specifically disclosed is a novel system, and method for matching a spent firearm cartridge. The method starts with applying a directed self-assembly (DSA) process to produce a nano-scale pattern on a tip of a firing pin for a firearm. The DSA process including: a) disposing a neutral substrate on the firing pin; b) lithographically placing two or more base polymer chains on the neutral substrate, at least two of the two or more base polymer chains being different lengths, so that the two or more base polymer chains align end-to-end in an alternating structure, and c) extracting at least one of the two or more base polymer chains leaving at least one of the base polymer chains remaining thereby forming a randomly oriented pattern. Next, the randomly oriented pattern is used as blocking mask to form a randomly oriented metallization pattern.

An image of the randomly oriented pattern is captured. This is stored in a database. The image may be captured using a scanning electronic microscope. The serial number of the firearm in which the firing pin is placed with the image of the randomly oriented metallization pattern.

To match a spent firearm cartridge, an image of the firing pin imprinted on a cartridge of bullet that has been fired. The database is searched to see if the image of the firing pin imprinted on the cartridge matches any other previously stored image.

BRIEF DESCRIPTION OF THE DRAWINGS

The accompanying figures wherein reference numerals refer to identical or functionally similar elements throughout the separate views, and which together with the detailed description below are incorporated in and form part of the specification, serve to further illustrate various embodiments and to explain various principles and advantages all in accordance with the present invention, in which.

DETAILED DESCRIPTION

Figure 1:
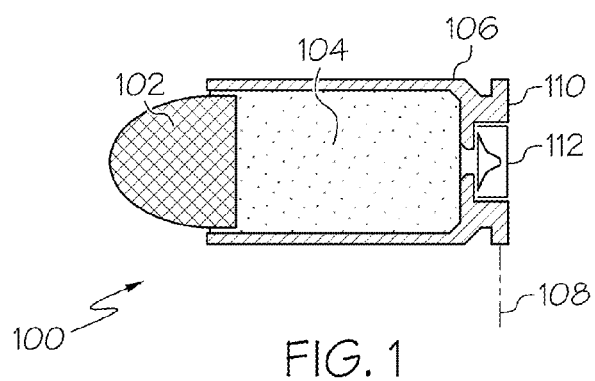
FIG. 1 is a cross-sectional diagram of a cartridge packing a bullet.

As required, detailed embodiments are disclosed herein; however, it is to be understood that the disclosed embodiments are merely examples and that the systems and methods described below can be embodied in various forms. Therefore, specific structural and functional details disclosed herein are not to be interpreted as limiting, but merely as a basis for the claims and as a representative basis for teaching one skilled in the art to variously employ the present subject matter in virtually any appropriately detailed structure and function. Further, the terms and phrases used herein are not intended to be limiting, but rather, to provide an understandable description of the concepts.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated. The terminology used herein is for the purpose of describing particular embodiments only and is not intended to be limiting of the invention.

Patterning of a low cost, uniquely random pattern that is constructed by self-assembled polymers into the firing pin of a firearm. When the firearm is discharged the firing pin will imprint the gun's unique signature into the casing inside of the firearm. The unique signature is extremely difficult to duplicate or remove due to nano-scale feature size. The signature can then be cross referenced with a database containing all of the patterns and their respective firearms. This will be able to identify the owner of the firearm with the shell casing from the firearm.

Non-Limiting Definitions

The terms "a", "an" and "the" are intended to include the plural forms as well, unless the context clearly indicates otherwise.

The terms "comprises" and/or "comprising", when used in this specification, specify the presence of stated features, steps, operations, elements, and/or components, but do not preclude the presence or addition of one or more other features, integers, steps, operations, elements, components, and/or groups thereof.

A "cartridge" or "shell" is a type of ammunition packaging a bullet or shot, a powder, usually either smokeless powder or black powder, and a primer within a metallic, paper, or plastic case that is made to fit within the firing chamber of a firearm.

"Directed self-assembly" refers to the integration of self-assembling materials with traditional manufacturing processes.

"Firearm" refers to any type of gun including revolvers, rifles, shotgun, pistols, machine gun including automatic and semiautomatic weapons.

A "self-assembly" refers to a process in which a disordered system of pre-existing components forms an organized structure or pattern as a consequence of specific, local interactions among the components themselves, without external direction. (Source Wikipedia).

A "spent cartridge" refers to a cartridge in which the firing pin has been released thereupon in order to ignite the powdered and firearm to fire. This is also referred to as a discharged cartridge.

Cartridge and Firearm

FIG. 1 is a cross-sectional diagram 100 of a cartridge 106 packing a bullet 102. The cartridge 106 includes the bullet 102 or projectile. A case 106 holds all parts together. Powder 104 and a rim 110 is shown. The rim 108 on end 110 provides the extractor on the firearm a place to grip the case 106 to remove it from a chamber once fired. A primer 112 on the end of the cartridge 106, ignites the gunpowder 104 upon impact of a firing pin.

Figure 2:
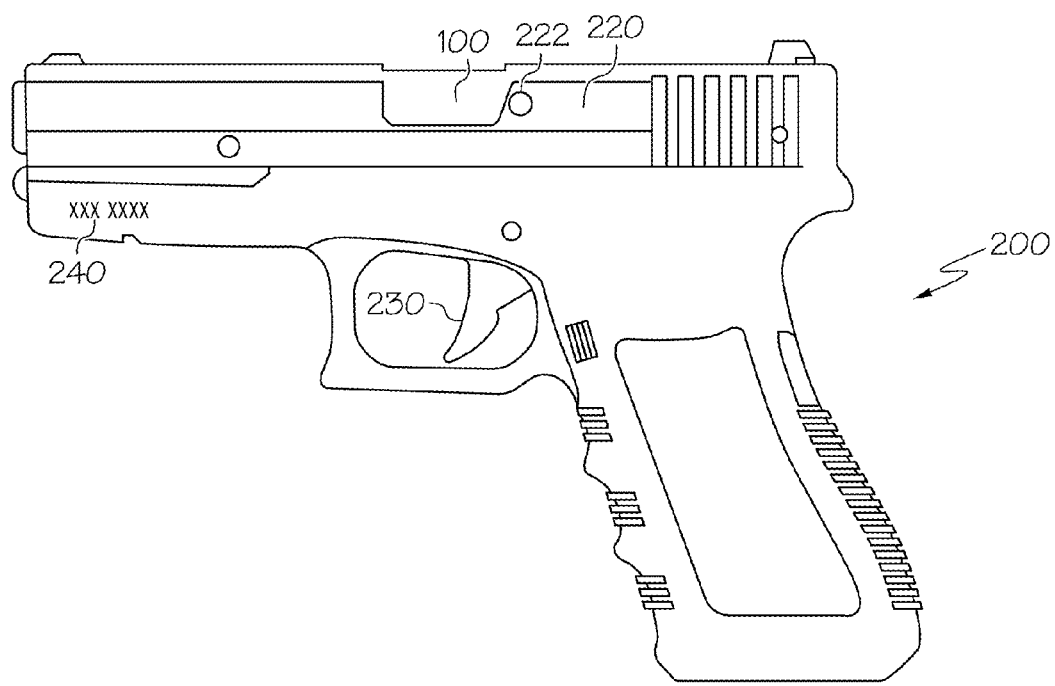
FIG. 2 is cross-sectional diagram of an example firearm used with the cartridge packing a bullet of FIG. 1.

FIG. 2 is cross-sectional diagram of an example firearm 200 used with the cartridge 106 with a bullet 102 of FIG. 1. The firearm 200 includes a barrel 222. Shown inside the barrel 222 is cartridge with a bullet 100. Pressure on the trigger 230 causes a tip of firing pin 220 to strike the primer 112. Also show is an example unique serial number 240 imprinted on the fire arm 200.

Firing Pin with Randomly Oriented Metallization Pattern

Figure 3:
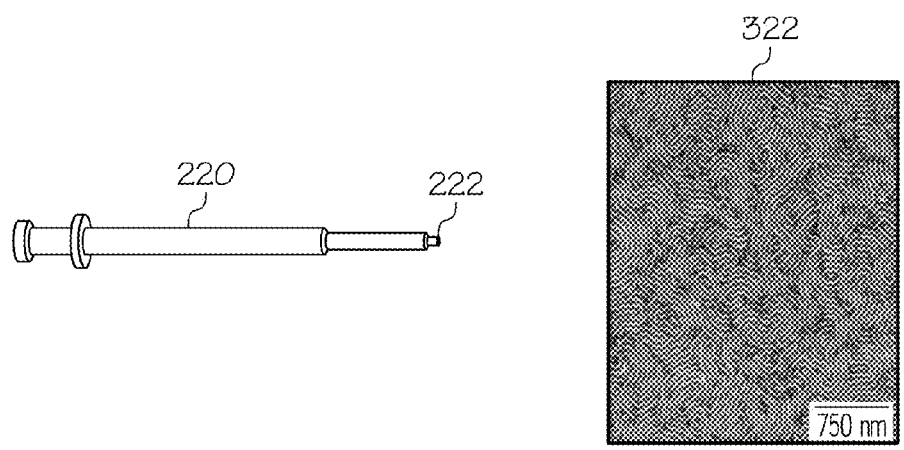
FIG. 3 is a firing pin with a tip of randomly oriented metallization pattern.
Figure 4:
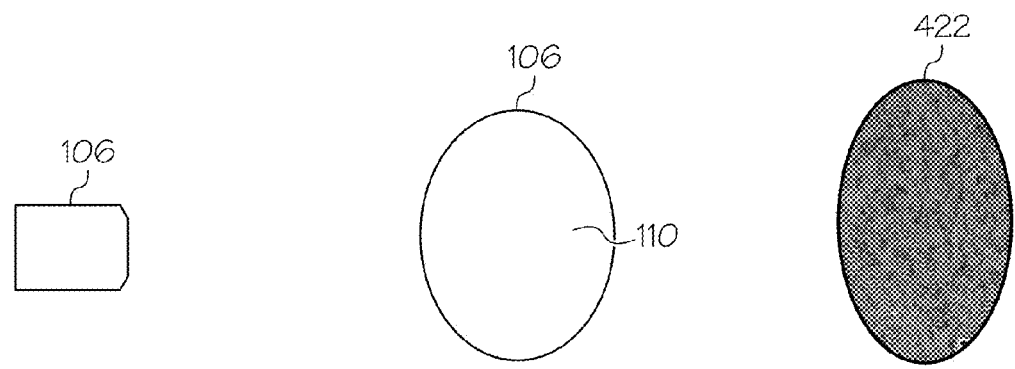
FIG. 4 a cartridge that has been struck with the metallization pattern from the randomly oriented metallization pattern of the tip.

FIG. 3 is a firing pin 220 with a tip 222 of randomly oriented metallization pattern 322. The tip 222 of the firing pin 220 strikes the primer 112 of the cartridge 106. The randomly oriented metallization pattern from on the tip 222 is embossed or stamped 422 onto the end with the primer 112 of the cartridge 106 as shown in FIG. 4. Because each randomly oriented pattern 422 is differently from the tip 222 of each firing pin 220 for each other firearm 200, the randomly oriented pattern 422 left on each fired cartridge 106 is analogous to unique "fingerprint".

Matching a Cartridge

Figure 5:
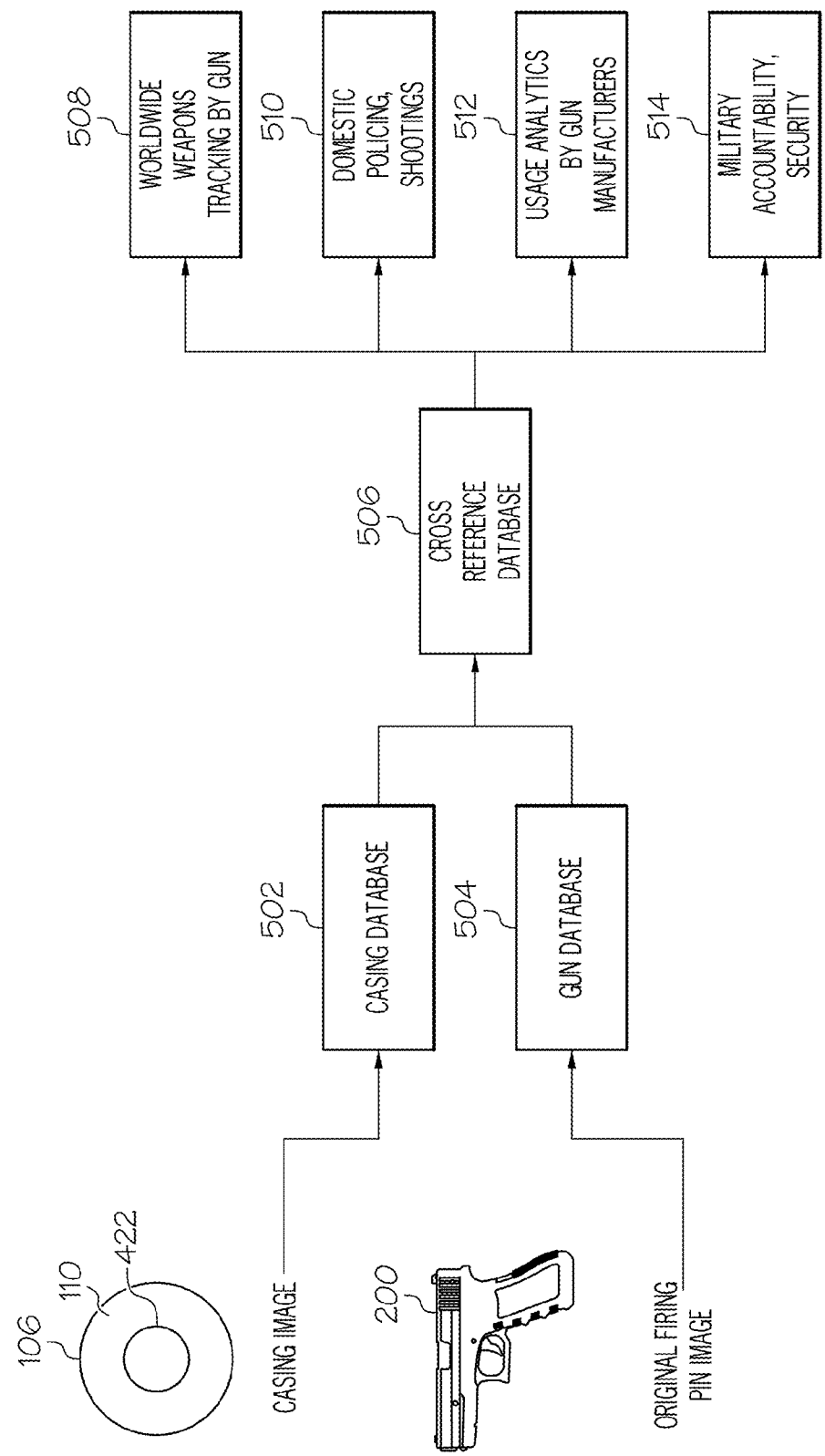
FIG. 5 a flow diagram of matching a cartridge of FIG. 4 with a database.

FIG. 5 a flow diagram 500 of matching a cartridge of FIG. 4 with a database. The rim end 110 of the spent or fired cartridge 106 with the primer 112 is imaged. Since this is nanometer imaging, technologies such as a scanning electron microscope may be used and store in database 502. An image of the randomly oriented metallization pattern 322 on the firing pin tip 222 is stored in a gun database 504. The serial number 240 and other information related to the firearm 200 including the manufacturer, the make, the model, the date of manufacture may also be included.

Once there is a cross reference made in 506. There are different applications that in which the presently claimed invention can be applied, including cloud-based applications. One use is worldwide weapons tracking by firearm 508. This provides a geographic starting point in which the firearm was manufactured to the geographic location in which it was used. Another use is domestic police shootings 510. This will help to match a cartridge found after a shooting with the firearm that discharged the cartridge.

Other applications of the presently claimed invention can be applied are Analytics By Firearm manufactures 512. This would let manufacturers know how their products are being used and for what purpose. Military accounting security 514 if a firearm is stolen or lost and a casing found later.

Process of Creating Randomly Oriented Mask Using Block Copolymer Lithography

Figure 6:
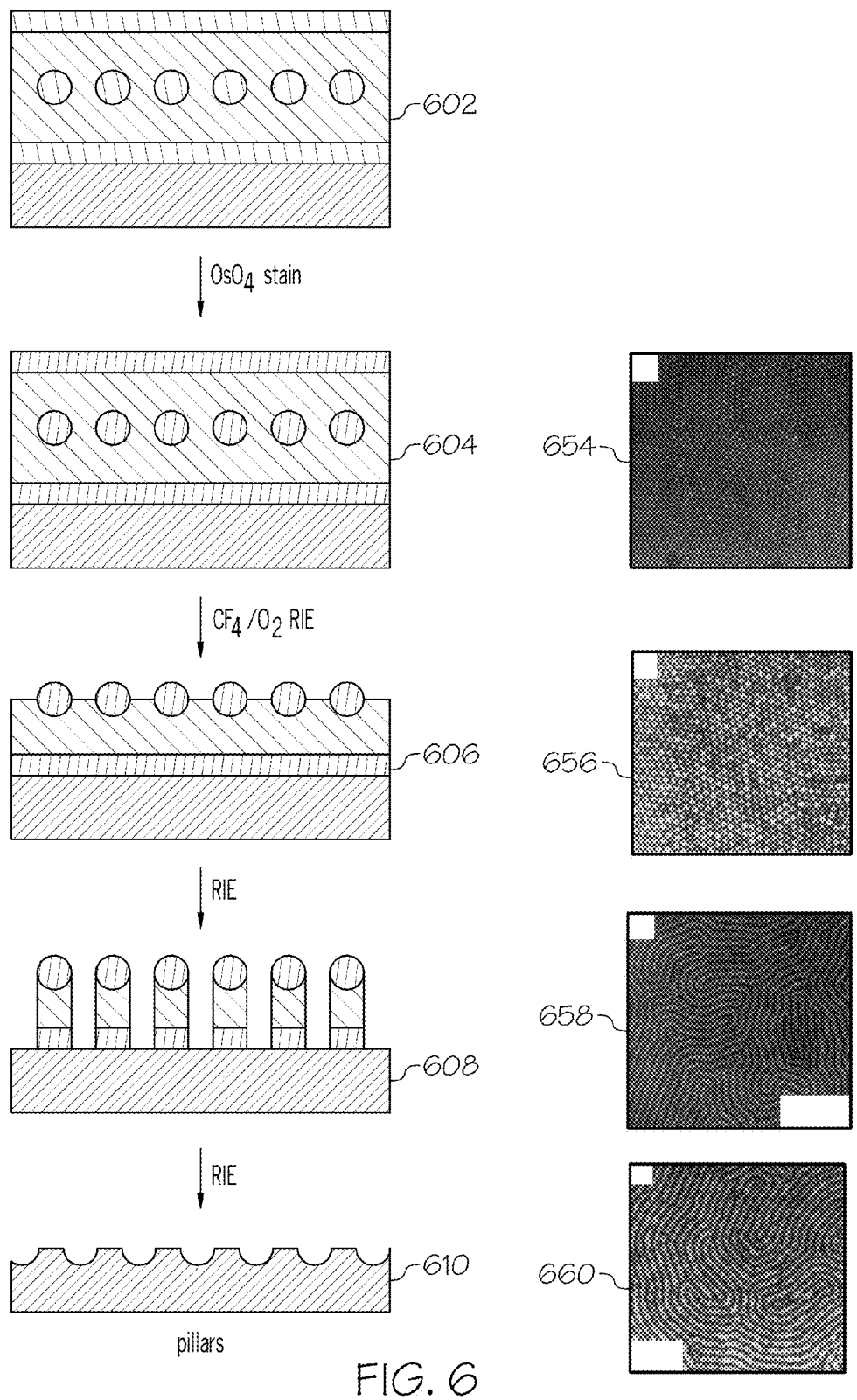
FIG. 6 a process flow diagram of applying a directed self-assembly (DSA) process to produce a randomly oriented metal pattern.

FIG. 6 a flow diagram 600 of creating a randomly oriented mask using block lithography. On a neutral substrate silicon wafer, a thin film of sphere-forming domain is disposed 602. Osmium tetroxide is used to selectively stain the poly (butadiene) spheres to impart etch resistance to form pillars in 604. The thin films of the BCPs are spin-coated onto a silicon wafer and, then, thermally annealed to allow the BCPs to self-assemble into a periodic array of PB (polybutadiene) spherical microdomains embedded in a PS (polystyrene) matrix i.e. polystyrene-block-polybutadiene. Image 654 is a scanning electronic microscope image corresponding to 604. The cylindrical domains are oriented parallel to the surface.

Shown in 606 is an ozone removal or staining of the PB block with osmium tetroxide (OsO4), a template with sufficient contrast for patterning using O2 RIE was produced. Image 656 is a corresponding scanning electronic microscope image corresponding to 606.

A periodic array of pillars is patterned into a Si3N4 substrate by CF4/O2 RIE. The use of self-assembly of BCPs to generate a pattern for transfer is highly parallel, occurring uniformly over large areas simultaneously in step 608. Also high areal densities can be achieved relatively simply without the need of multi-step, photolithographic processes. Image 658 is a corresponding scanning electronic microscope image corresponding to 608.

The Si3N4 intermediate layer takes advantage of the high selectivity between the hard Si3N4 mask and the underlying polyimide layer during O2 RIE. Therefore, after the transfer of the spherical microdomain structure to Si3N4, subsequent etching through the Si3N4 to the underlying polyimide layer produced a high-aspect-ratio polyimide structure.

Process of Creating Randomly Oriented Mask Using Block Copolymer Lithography

Figure 7:
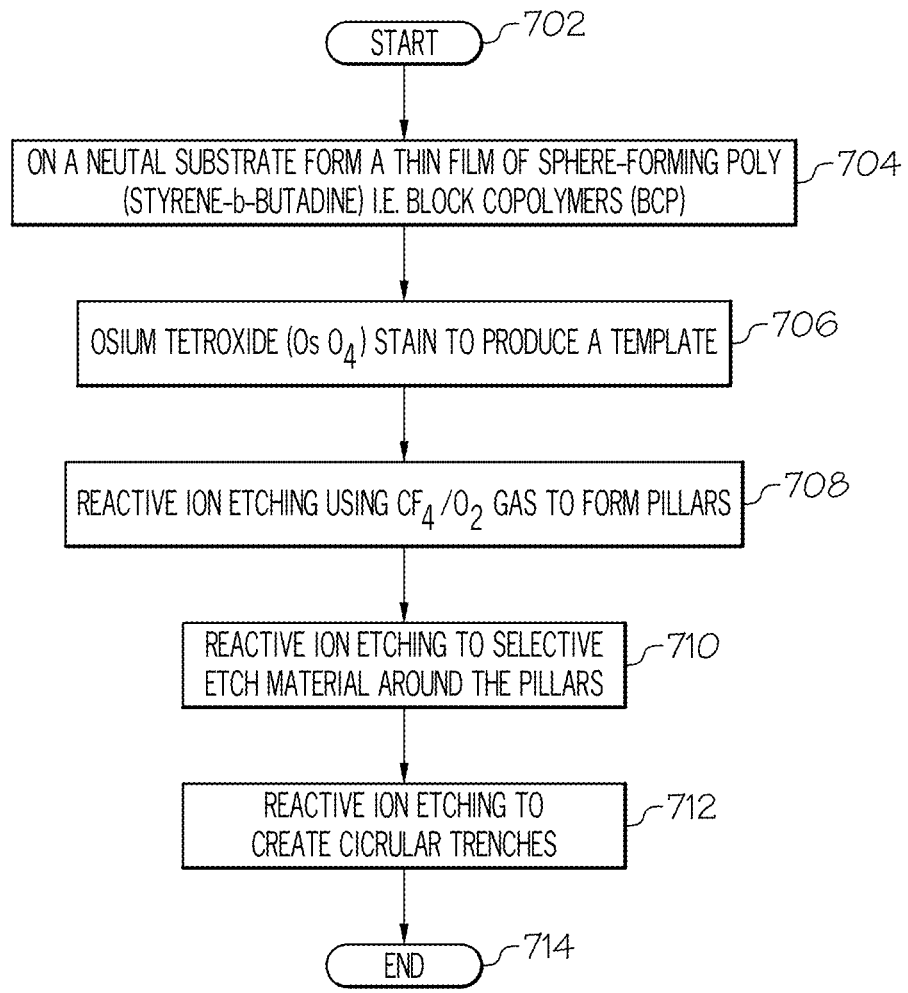
FIG. 7 a flow diagram 700 of creating a randomly oriented mask using block of copolymers.

FIG. 7 a flow diagram 700 of creating a randomly oriented mask using block of copolymers. The process flow starts in step 702 and immediately proceeds to step 704 in which a thin film of sphere-forming poly (stryene-b-butadine) is formed on a neutral substrate.

Next, in step 706 osmium tetroxide is used to stain the poly(butadiene) spheres to impart etch resistance to form a template of pillars.

In step 708, reactive ion etching (REI) using $CF_4/O_2$ to form pillars. Followed by reactive ion etching in step 710 to selective etch the material around the pillars as shown in FIG. 6 substrate 608 and reactive ion etching in step 712 to create circular trenches into the substrate material thus transferring our randomly oriented pattern on substrate 608 into the substrate shown as substrate 610. This allows for the randomly oriented patter to be etched directly into the substrate rather than have the structure be based on standing pillars as shown in FIG. 6 substrate 608.

Once substrate 610 is obtained from the lithography and etch process. The trenches can be filled using standard metal plating processes. These now metalized structures can be placed onto the tip of the firing pin. Alternative techniques such as nanoimprint lithography which is a cost effective technique would allow for the pattern to be transferred from the substrate to the pin. The process ends in step 714.

In applications in which the firing pin is not compatible with copolymer structures for direct depositing thereon. The randomly oriented structures on a neutral substrates can be created independent from the firing pin. They are then metalized to form randomly originated metalized structures. A nano-imprinting device is then used to stamp these patterns onto the firing pin.

There are many different types of nanoimprinting technology. Some examples of nanoimprint technology can be electrochemical in nature, laser based or even pulsed laser based. In electrochemical nanoimprinting a superionic conductor material is utilized. This superionic conductor material is utilized as the stamp layer. When the conductor material comes in contact with the metal etching can be performed by applying a voltage. Laser based nanoimprinting technology almost always requires a pulsed beam. These beams allow for rapid melting of metals and rapid fill of structures. Resolutions have been achieved better than 10 nm and have an embossing time of less than 300 ns. Examples of nano print technology can be found in the following references:

Hsu, K. H.; Schultz, P. L.; Ferreira, P. M.; Fang, N. X. (2007). "*Electrochemical Nanoimprinting with Solid-State Superionic Stamps*". Nano Lett 7 (2): 446-451. Bibcode:2007NanoL . . . 7 . . . 446H. doi:10.1021/n1062766o. PMID 17256917.

Chou, S. Y.; Keimel, C.; Gu, J. (2002). "*Ultrafast and Direct Imprint of Nanostructures in Silicon*". Nature 417 (6891): 835-837. Bibcode:2002Natur.417 . . . 835C. doi:10.1038/nature00792. PMID 12075347.

Massimo Tormen; Enrico Sovernigo; Alessandro Pozzato; Michele Pianigiani; Maurizio Tormen (2015). "*Sub-100 µs nanoimprint lithography at wafer scale*". Microelectronic Engineering 141: 21-26. doi:10.1016/j.mee.2015.01.002.

The teachings of each of the above references are hereby incorporated by reference in their entirety.

Generalized Computing Environment

Figure 8:
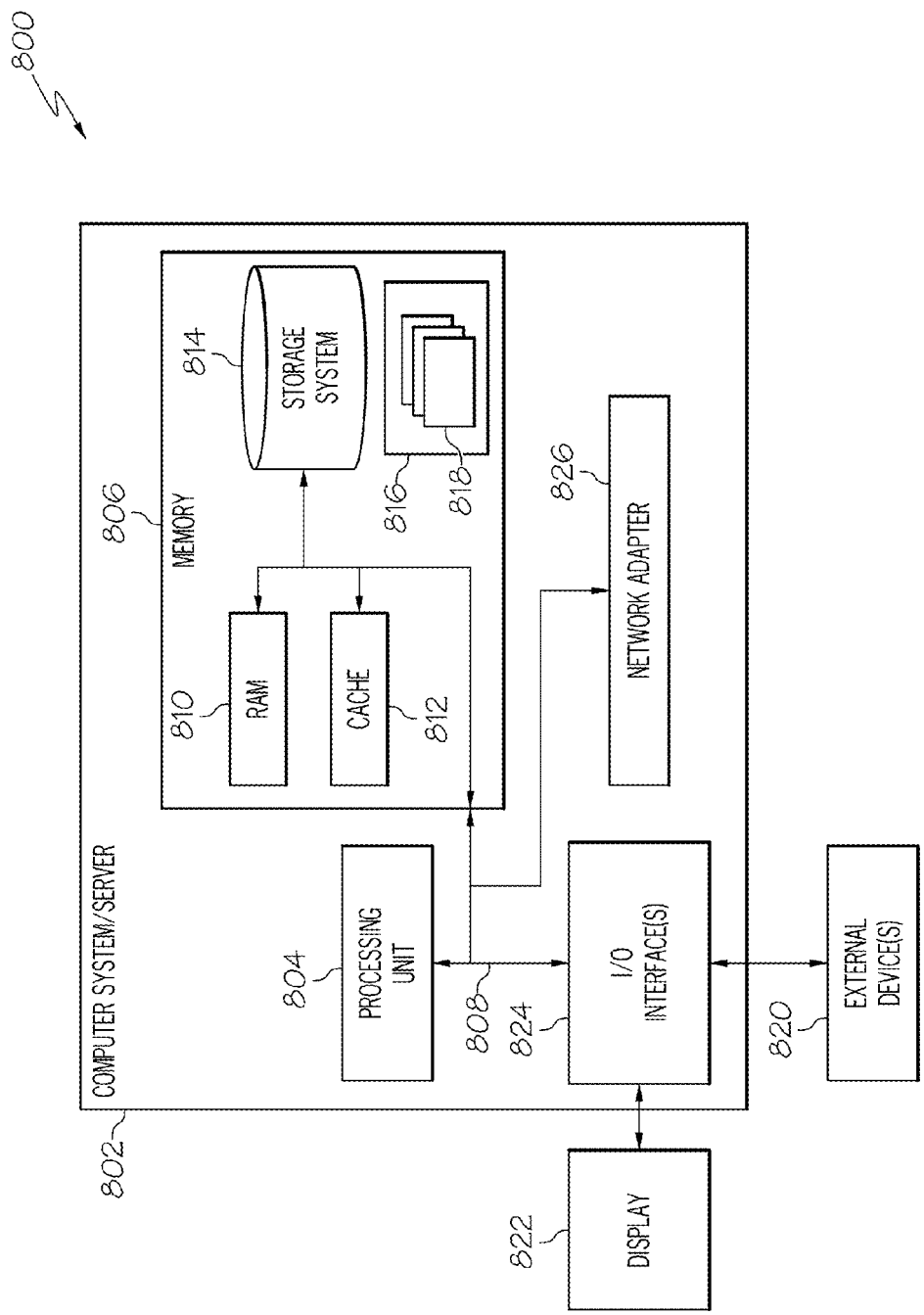
FIG. 8 illustrates one example of a cloud computing node.

FIG. 8 illustrates one example of a processing node 800 for carrying out the process flow of FIG. 5 and FIG. 7. This example is not intended to suggest any limitation as to the scope of use or functionality of embodiments of the invention described herein. Regardless, the computing node 800 is capable of being implemented and/or performing any of the functionality set forth hereinabove.

In computing node 800 there is a computer system/server 802, which is operational with numerous other general purpose or special purpose computing system environments or configurations. Examples of well-known computing systems, environments, and/or configurations that may be suitable for use with computer system/server 802 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 802 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 802 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, computer system/server 802 in cloud computing node 800 is shown in the form of a general-purpose computing device. The components of computer system/server 802 may include, but are not limited to, one or more processors or processing units 804, a system memory 806, and a bus 808 that couples various system components including system memory 806 to processor 804.

Bus 808 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 802 typically includes a variety of computer system readable media. Such media may be any available media that is accessible by computer system/server 802, and it includes both volatile and non-volatile media, removable and non-removable media.

System memory 806, in one embodiment, implements the flow chart of FIG. 5. The system memory 806 can include computer system readable media in the form of volatile memory, such as random access memory (RAM) 810 and/or cache memory 812. Computer system/server 802 may further include other removable/non-removable, volatile/non-volatile computer system storage media. By way of example only, storage system 814 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 808 by one or more data media interfaces. As will be further depicted and described below, memory 806 may include at least one program product having a set (e.g., at least one) of program modules that are configured to carry out the functions of various embodiments of the invention.

Program/utility 816, having a set (at least one) of program modules 818, may be stored in memory 806 by way of example, and not limitation, as well as an operating system, one or more application programs, other program modules, and program data. Each of the operating system, one or more application programs, other program modules, and program data or some combination thereof, may include an implementation of a networking environment. Program modules 818 generally carry out the functions and/or methodologies of various embodiments of the invention as described herein.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon. The computer program product is typically non-transitory but in other examples it may be transitory.

Computer system/server 802 may also communicate with one or more external devices 1020 such as a keyboard, a pointing device, a display 822, etc.; one or more devices that enable a user to interact with computer system/server 802; and/or any devices (e.g., network card, modem, etc.) that enable computer system/server 802 to communicate with one or more other computing devices. Such communication can occur via I/O interfaces 824. Still yet, computer system/server 802 can communicate with one or more networks such as a local area network (LAN), a general wide area network (WAN), and/or a public network (e.g., the Internet) via network adapter 826. As depicted, network adapter 826 communicates with the other components of computer system/server 802 via bus 808. It should be understood that although not shown, other hardware and/or software components could be used in conjunction with computer system/server 802. Examples, include, but are not limited to: microcode, device drivers, redundant processing units, external disk drive arrays, RAID systems, tape drives, and data archival storage systems, etc.

Cloud Computer Environment

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 9:
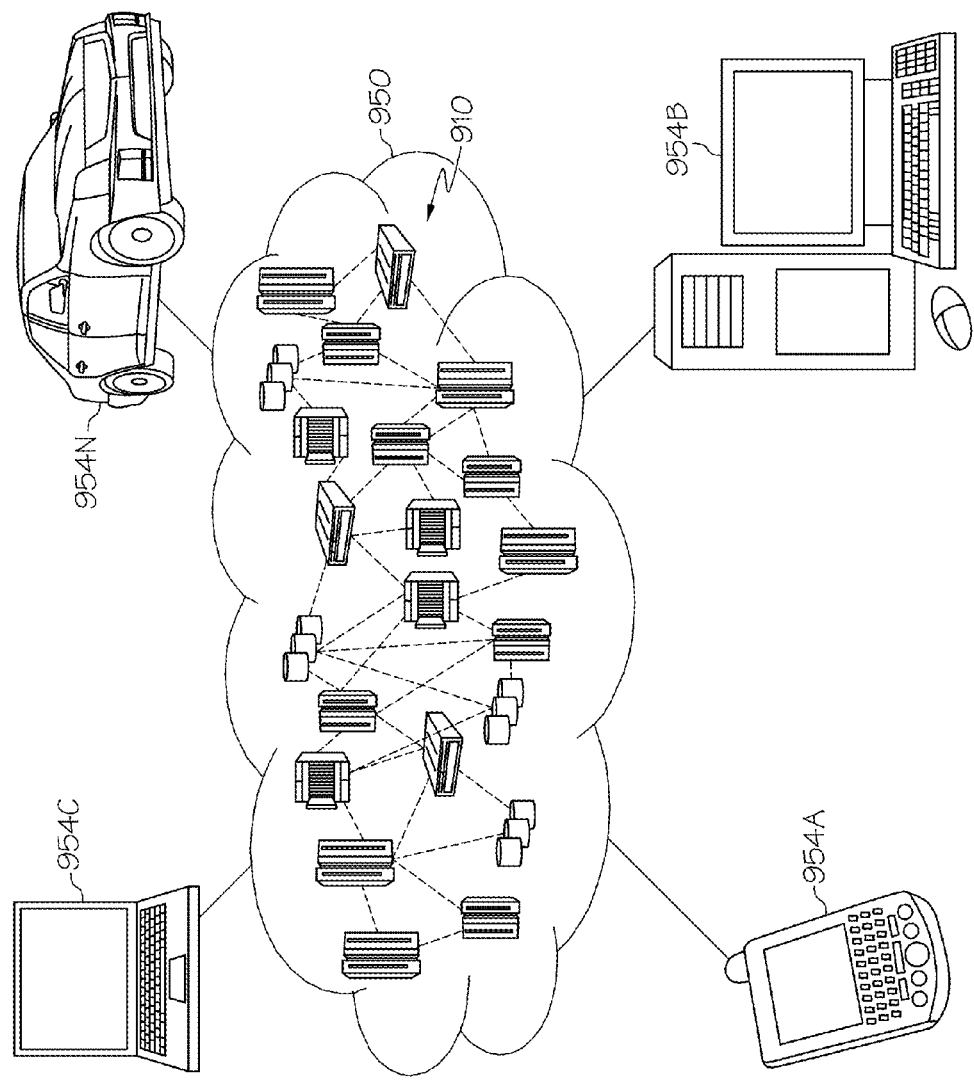
FIG. 9 illustrates one example of a cloud computing environment.

Referring now to FIG. 9, illustrative cloud computing environment 950 is depicted. As shown, cloud computing environment 950 comprises one or more cloud computing nodes 910 with which local computing devices used by cloud consumers, such as, for example, personal digital assistant (PDA) or cellular telephone 954A, desktop computer 954B, laptop computer 954C, and/or automobile computer system 954N may communicate. Nodes 910 may communicate with one another. They may be grouped (not shown) physically or virtually, in one or more networks, such as Private, Community, Public, or Hybrid clouds as described hereinabove, or a combination thereof. This allows cloud computing environment 950 to offer infrastructure, platforms and/or software as services for which a cloud consumer does not need to maintain resources on a local computing device. It is understood that the types of computing devices 954A-N shown in FIG. 9 are intended to be illustrative only and that computing nodes 910 and cloud computing environment 950 can communicate with any type of computerized device over any type of network and/or network addressable connection (e.g., using a web browser).

Figure 10:
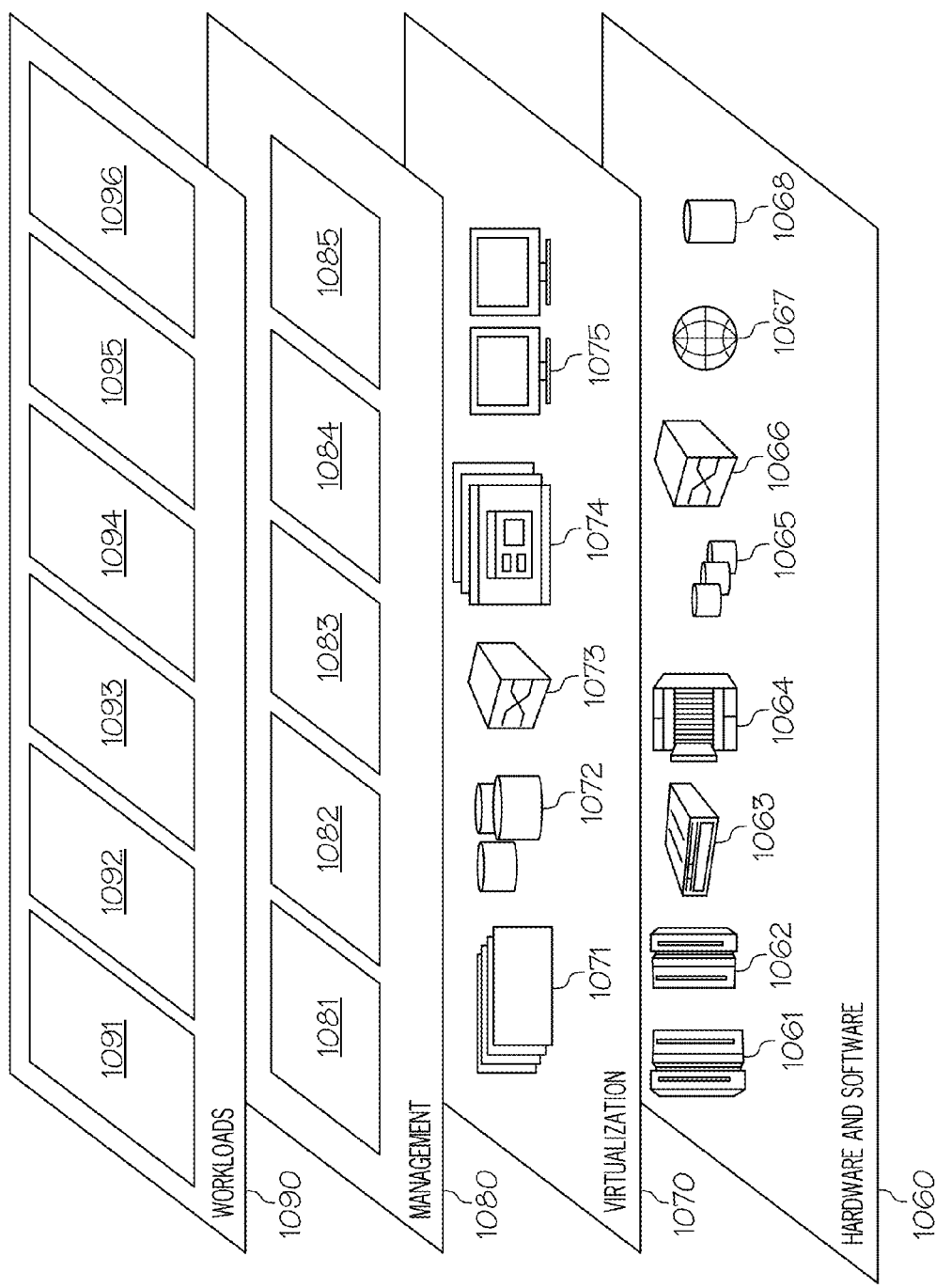
FIG. 10 illustrates abstraction model layers according to one example of the present invention.

Referring now to FIG. 10, a set of functional abstraction layers provided by cloud computing environment 950 is shown. It should be understood in advance that the components, layers, and functions shown in FIG. 10 are intended to be illustrative only and embodiments of the invention are not limited thereto. As depicted, the following layers and corresponding functions are provided:

Hardware and software layer 1060 includes hardware and software components. Examples of hardware components include: mainframes 1061; RISC (Reduced Instruction Set Computer) architecture based servers 1062; servers 1063; blade servers 1064; storage devices 1065; and networks and networking components 1066. In some embodiments, software components include network application server software 1067 and database software 1068.

Virtualization layer 1070 provides an abstraction layer from which the following examples of virtual entities may be provided: virtual servers 1071; virtual storage 1072; virtual networks 1073, including virtual private networks; virtual applications and operating systems 1074; and virtual clients 1075.

In one example, management layer 1080 may provide the functions described below. Resource provisioning 1081 provides dynamic procurement of computing resources and other resources that are utilized to perform tasks within the cloud computing environment. Metering and Pricing 1082 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1083 provides access to the cloud computing environment for consumers and system administrators. Service level management 1084 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 1090 provides examples of functionality for which the cloud computing environment may be utilized. Examples of workloads and functions which may be provided from this layer include: mapping and navigation 1091; software development and lifecycle management 1092; virtual classroom education delivery 1093; data analytics processing 1094; transaction processing 1095; and for delivering services from a server to ensure multimedia content control by content providers (i.e. reduce piracy) and to ensure privacy by content users 1096.

Non-Limiting Examples

The description of the present application has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for matching a spent firearm cartridge, the method comprising:
    applying a directed self-assembly (DSA) process to produce a nano-scale pattern on a tip of a firing pin for a firearm, the DSA process including
        disposing a neutral substrate on the firing pin;
        lithographically placing two or more base polymer chains on the neutral substrate, at least two of the two or more base polymer chains being different lengths, so that the two or more base polymer chains align end-to-end in an alternating structure; and
        extracting at least one of the two or more base polymer chains leaving at least one of the base polymer chains remaining thereby forming a randomly oriented pattern; and
    using the randomly oriented pattern as blocking mask to form a randomly oriented metallization pattern.

2. The method of claim 1, further comprising:
    taking an image of the randomly oriented metallization pattern; and
    storing the image of the randomly oriented metallization pattern in a database.

3. The method of claim 2, wherein the taking an image of the randomly oriented metallization pattern includes using a scanning electron microscope.

4. The method of claim 2, further comprising:
    storing a serial number associated with the firearm in which the firing pin is placed along with the image of the randomly oriented metallization pattern.

5. The method of claim 2, further comprising:
    imaging a firing pin imprinted on a cartridge of a bullet that has been fired; and
    searching the image of the randomly oriented metallization pattern in the database to determine a match.

6. A system for matching a spent firearm cartridge, the system comprising:
    a memory;
    a processor communicatively coupled to the memory, where the processor is configured to perform
    applying a directed self-assembly (DSA) process to produce a nano-scale pattern on a tip of a firing pin for a firearm, the DSA process including
        disposing a neutral substrate on the firing pin;
        lithographically placing two or more base polymer chains on the neutral substrate, at least two of the two or more base polymer chains being different lengths, so that the two or more base polymer chains align end-to-end in an alternating structure; and
        extracting at least one of the two or more base polymer chains leaving at least one of the base polymer chains remaining thereby forming a randomly oriented pattern; and using the randomly oriented pattern as blocking mask to form a randomly oriented metallization pattern.

7. The system of claim 6, further comprising:
taking an image of the randomly oriented metallization pattern; and
storing the image of the randomly oriented metallization pattern in a database.

8. The system of claim 7, wherein the taking an image of the randomly oriented metallization pattern includes using a scanning electron microscope.

9. The system of claim 7, further comprising:
storing a serial number associated with the firearm in which the firing pin is placed along with the image of the randomly oriented metallization pattern.

10. The system of claim 7, further comprising:
imaging a firing pin imprinted on a cartridge of a bullet that has been fired; and
searching the image of the randomly oriented metallization pattern in the database to determine a match.

11. A non-transitory computer program product for matching a spent firearm cartridge, the computer program product configured to perform:
applying a directed self-assembly (DSA) process to produce a nano-scale pattern on a tip of a firing pin for a firearm, the DSA process including
disposing a neutral substrate on the firing pin;
lithographically placing two or more base polymer chains on the neutral substrate, at least two of the two or more base polymer chains being different lengths, so that the two or more base polymer chains align end-to-end in an alternating structure; and
extracting at least one of the two or more base polymer chains leaving at least one of the base polymer chains remaining thereby forming a randomly oriented pattern; and
using the randomly oriented pattern as blocking mask to form a randomly oriented metallization pattern.

12. The non-transitory computer program product of claim 11, further comprising:
taking an image of the randomly oriented metallization pattern; and
storing the image of the randomly oriented metallization pattern in a database.

13. The non-transitory computer program product of claim 12, wherein the taking an image of the randomly oriented metallization pattern includes using a scanning electron microscope.

14. The non-transitory computer program product of claim 12, further comprising:
storing a serial number associated with the firearm in which the firing pin is placed along with the image of the randomly oriented metallization pattern.

15. The non-transitory computer program product of claim 12, further comprising:
imaging a firing pin imprinted on a cartridge of a bullet that has been fired; and
searching the image of the randomly oriented metallization pattern in the database to determine a match.

16. A method for matching a spent firearm cartridge, the method comprising:
applying a directed self-assembly (DSA) process to produce a nano-scale pattern on a neutral substrate, the DSA process including
disposing a neutral substrate on the neutral substrate;
lithographically placing two or more base polymer chains on the neutral substrate, at least two of the two or more base polymer chains being different lengths, so that the two or more base polymer chains align end-to-end in an alternating structure; and
extracting at least one of the two or more base polymer chains leaving at least one of the base polymer chains remaining thereby forming a randomly oriented pattern;
using the randomly oriented pattern as blocking mask to form a randomly oriented metallization pattern; and
using nanoprinting to stamp the randomly oriented metallization pattern on a tip of a firing pin for a firearm.

17. The method of claim 16, further comprising:
taking an image of the randomly oriented metallization pattern; and
storing the image of the randomly oriented metallization pattern in a database.

18. The method of claim 17, further comprising:
imaging a firing pin imprinted on a cartridge of a bullet that has been fired; and
searching the image of the randomly oriented metallization pattern in the database to determine a match.

19. A system for matching a spent firearm cartridge, the system comprising:
a memory;
a processor communicatively coupled to the memory, where the processor is configured to perform
applying a directed self-assembly (DSA) process to produce a nano-scale pattern on a neutral substrate, the DSA process including
disposing a neutral substrate on the neutral substrate;
lithographically placing two or more base polymer chains on the neutral substrate, at least two of the two or more base polymer chains being different lengths, so that the two or more base polymer chains align end-to-end in an alternating structure, and
extracting at least one of the two or more base polymer chains leaving at least one of the base polymer chains remaining thereby forming a randomly oriented pattern;
using the randomly oriented pattern as blocking mask to form a randomly oriented metallization pattern; and
using nanoprinting to stamp the randomly oriented metallization pattern on a tip of a firing pin for a firearm.

20. The system of claim 19, further comprising:
taking an image of the randomly oriented metallization pattern; and
storing the image of the randomly oriented metallization pattern in a database.

21. The system of claim 20, further comprising:
imaging a firing pin imprinted on a cartridge of a bullet that has been fired; and
searching the image of the randomly oriented metallization pattern in the database to determine a match.

* * * * *